(12) United States Patent
Kraus et al.

(10) Patent No.: US 12,577,445 B2
(45) Date of Patent: Mar. 17, 2026

(54) DISPERSION ADHESIVES

(71) Applicant: Covestro Deutschland AG, Leverkusen (DE)

(72) Inventors: Harald Kraus, Leverkusen (DE); Robert Liberati, Hürth-Efferen (DE); Peter Kueker, Leverkusen (DE); Martin Melchiors, Leichlingen (DE)

(73) Assignee: Covestro Deutschland AG, Leverkusen (DE)

( * ) Notice: Subject to any disclaimer, the term of this patent is extended or adjusted under 35 U.S.C. 154(b) by 1045 days.

(21) Appl. No.: 17/638,882

(22) PCT Filed: Aug. 28, 2020

(86) PCT No.: PCT/EP2020/074048
§ 371 (c)(1),
(2) Date: Feb. 28, 2022

(87) PCT Pub. No.: WO2021/043674
PCT Pub. Date: Mar. 20, 2021

(65) Prior Publication Data
US 2022/0306916 A1       Sep. 29, 2022

(30) Foreign Application Priority Data
Sep. 4, 2019     (EP) ..................................... 19195334

(51) Int. Cl.
C09J 175/04         (2006.01)
C09J 11/06          (2006.01)
(Continued)

(52) U.S. Cl.
CPC ............. C09J 175/04 (2013.01); C09J 11/06 (2013.01); C09J 11/08 (2013.01); A47C 27/05 (2013.01); C08L 75/04 (2013.01)

(58) Field of Classification Search
CPC .......... C09J 175/04; C09J 11/06; C09J 11/08; A47C 27/05; C08L 75/04
See application file for complete search history.

(56) References Cited

U.S. PATENT DOCUMENTS 9,453,147 B2      9/2016   Kraus et al.
10,384,219 B2     8/2019   de Block et al.
(Continued)

FOREIGN PATENT DOCUMENTS

CA         1061043        8/1979
CA         2253119        5/1999
(Continued)

OTHER PUBLICATIONS

International Search Report, PCT/EP2020/074048, date of mailing: Oct. 30, 2020, Authorized officer. Günther Scheid.

*Primary Examiner* — Jiangtian Xu
(74) *Attorney, Agent, or Firm* — Donald R. Palladino

(57)                ABSTRACT
The invention relates to formulations of aqueous dispersion adhesives based on aqueous polyurethane or polyurethane-urea dispersions, and to the use of the adhesive formulations for the adhesive bonding of foam substrates by the spray coagulation process. The dispersion comprises as disperse phase at least one polymer which after drying is semicrystalline or crystalline and has a melting temperature in the range from 30 to 80° C. and an enthalpy of fusion of ≥35 J/g. The formulation comprises at least one plasticizer and optionally at least one tackifier resin.

16 Claims, 1 Drawing Sheet

(51) Int. Cl.
　　_C09J 11/08_　　　　(2006.01)
　　_A47C 27/05_　　　　(2006.01)
　　_C08L 75/04_　　　　(2006.01)

(56)　　　　　　　References Cited

U.S. PATENT DOCUMENTS

| | | | |
|---|---|---|---|
| 2009/0240005 A1 | 9/2009 | Kraus et al. | |
| 2014/0249267 A1* | 9/2014 | Kraus | C09J 9/00 |
| | | | 524/591 |
| 2015/0079339 A1 | 3/2015 | Covelli et al. | |
| 2018/0320036 A1* | 11/2018 | De Block | C09J 11/08 |
| 2020/0339808 A1* | 10/2020 | Kraus | C08G 18/0866 |
| 2021/0317351 A1 | 10/2021 | Kraus et al. | |

FOREIGN PATENT DOCUMENTS

| | | | |
|---|---|---|---|
| CN | 108350330 A | 7/2018 | |
| EP | 3514186 A1 | 7/2019 | |
| WO | 20140182170 A1 | 11/2014 | |
| WO | 2017074184 A1 | 5/2017 | |

\* cited by examiner

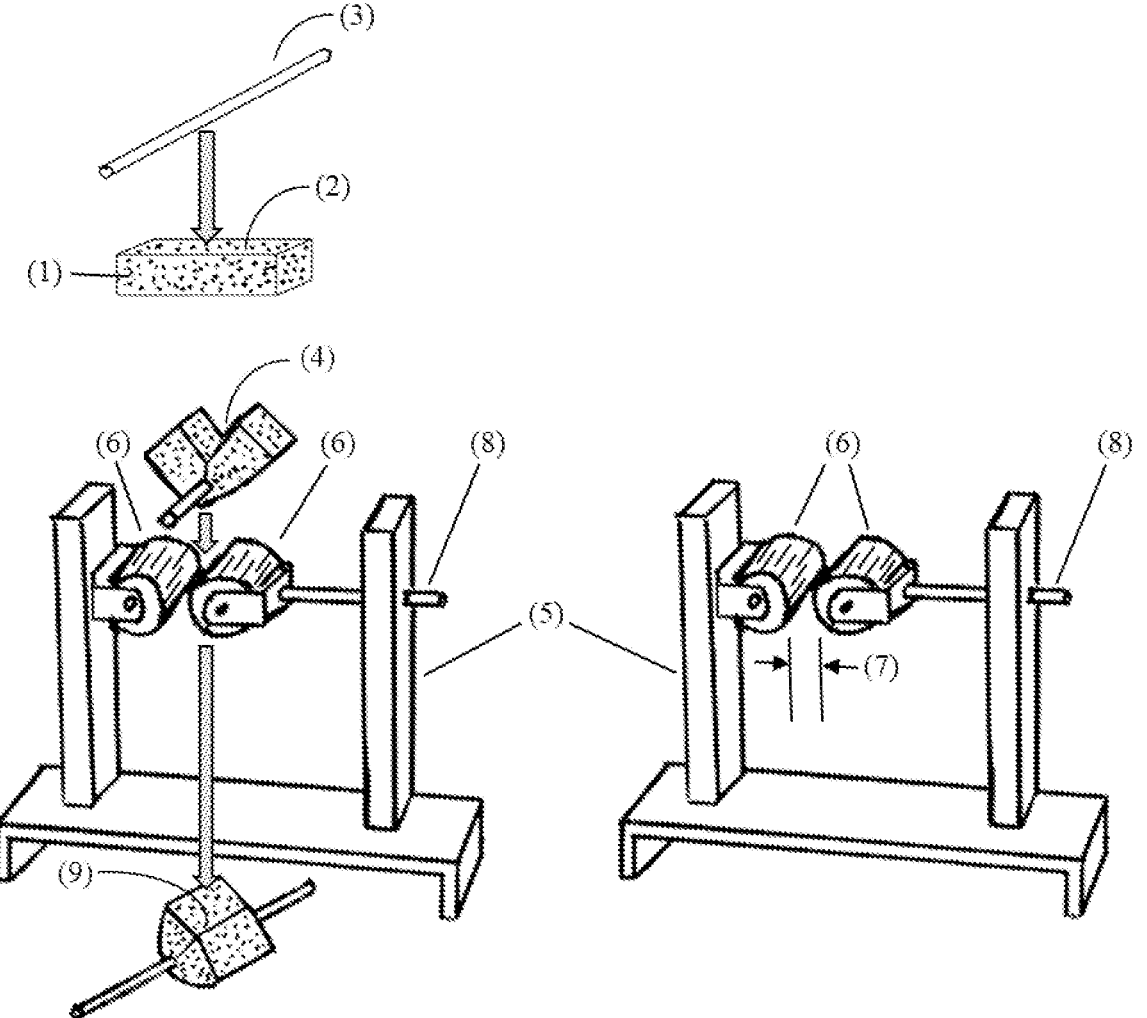

DISPERSION ADHESIVES

CROSS-REFERENCE TO RELATED APPLICATIONS

This application is a national stage application under 35 U.S.C. 371 of PCT/EP2020/074048, filed Aug. 28, 2020, which claims the benefit of European application no. 19195334.8, filed Sep. 4, 2019, each of which is incorporated herein by reference.

FIELD OF THE INVENTION

The invention relates to formulations of aqueous dispersion adhesives based on aqueous polyurethane or polyurethane-urea dispersions, to a process for preparing same, and to the use of the dispersion adhesives for the adhesive bonding of foam substrates by the spray coagulation process.

BACKGROUND

When adhesively bonding foam substrates to other substrates, for example for the combinations foam-foam, foam-wood and foam-plastic, use is predominantly made of polychloroprene dispersion adhesives in a spray coagulation process. In this process, the adhesive and a coagulant are conveyed separately into a spray gun, mixed in the spray jet and coagulated. As the mixing does not take place until in the spray jet, no pot life needs to be taken into account. In addition, the coagulated adhesive remains on the substrate surface to be adhesively bonded and only diffuses to a minor extent, if at all, into the pore structure of the foam substrates. This frequently achieves high initial strengths, sufficiently long open times and good heat resistances.

Important fields of application for this spray coagulation process are the production of mattresses and seating furniture. In particular from Scandinavian countries, there is a demand for organochlorine-free alternatives to the polychloroprene dispersion adhesives, in order for example to be able to satisfy the requirements of the Nordic Ecolabel. In addition, they should feature high initial strengths, a sufficiently long open time and good heat resistances.

Adhesives based on aqueous polyurethane dispersions have become established worldwide in demanding industrial applications, for example in the case of shoe manufacturing, the bonding of parts for motor vehicle interiors, sheet lamination or adhesive bonding of textile substrates.

In the case of the use of such adhesives based on aqueous polyurethane dispersions for bonding substrates, this is usually carried out after the heat-activation process. In this case, the dispersion is applied to the substrate and, after complete evaporation of the water, the adhesive layer is activated by heating, for example using an infrared radiator, and is converted into an adhesive state. The temperature at which the adhesive film becomes sticky is referred to as the activation temperature.

However, when using polyurethane or polyurethane-polyurea dispersions, the process of wet bonding can also be used, that is to say the adhesive bonding is effected immediately after application of the adhesive. Mechanical securing of the parts to be joined is in this case necessary until the adhesive has set. This process is often used for the adhesive bonding of wood or textile substrates.

Both the heat activation process and the wet bonding process are of limited suitability for the adhesive bonding of foam substrates. The slow evaporation of the water, in particular, requires long waiting times between application of the adhesive and the bonding process, or corresponding drying installations. In addition, a not insignificant portion of the adhesive can diffuse into the pores of the foam substrates prior to or during the drying and is then no longer available for the actual bonding.

The adhesives based on aqueous polyurethane dispersions which have become established on the market are in general unsuitable for the use of the spray coagulation process, since they frequently do not coagulate sufficiently quickly, they lead to poor heat resistances and, in particular on difficult substrates such as for example foams having a high restoring force, they do not display sufficient adhesion and strength. The open time, that is to say the time period between application of the adhesive until joining together the parts to be joined, during which a sufficiently good bonded connection is still obtained, is also usually less than 2 minutes. For many bonding processes, a markedly longer time period is required.

WO 2013/053786 A1 describes aqueous polyurethane dispersions, the polymer of which has a melting temperature in the range from 30° C. to 50° C., determined by differential scanning calorimetry in accordance with DIN 65467 at a heating rate of 20 K/min, wherein the polymer is obtainable from two dissimilarly crystallizing polyester polyols in specified quantitative ratios. These polyurethane dispersions are primarily suitable as cold contact adhesives, but can also be employed using spray coagulation processes. However, the strengths achievable thereby are insufficient for most foam bonding applications.

Luphen® D DS 3548 from BASF AG (Ludwigshafen, Germany) provides an epoxy resin-modified polyurethane dispersion which inter alia is reportedly also suitable for the spray coagulation process. The basis of the epoxy resin used here is bisphenol A diglycidyl ether. Since these epoxy resins are viewed in an extremely critical manner in particular by end users and are therefore generally rejected, the market demands adhesives and other products which are not based on epoxy resins.

WO 2014/182170 A1 describes performing the spray coagulation process using a particular airless spray process. To this end, both mixtures of polychloroprene dispersions and tackifier dispersions and of polyurethane dispersions and tackifier dispersions are used. However, these are not specified further in this document. Fields of application mentioned are foam adhesive bonds in the mattress and furniture manufacturing sector.

US 2015/0079339 A1 describes multilayer articles, also consisting inter alia of foam substrates, which are produced by adhesive bonding using a polyurethane dispersion in the temperature range from 100 to 200° C. In order to prevent penetration of the adhesive dispersion into the pores of the substrates, coagulants may optionally be added, but a spray coagulation process is not used.

BRIEF DESCRIPTION OF THE DRAWING

THE FIGURE illustrates an apparatus for assessing the initial strength of an adhesive of the invention upon a foam body.

DETAILED DESCRIPTION OF THE INVENTION

The object of the present invention was therefore that of providing an organochlorine- and epoxide-free alternative to polychloroprene dispersion adhesives for the adhesive bonding of foam substrates by the spray coagulation process which does not exhibit the disadvantages of the prior art and displays sufficient adhesion and strength even on difficult substrates, especially in the case of foams having a high restoring force. In addition, it is intended to enable a high heat resistance, in particular of at least 70° C., and a long open time, in particular of at least 5 minutes.

It has surprisingly now been found that aqueous adhesive formulations containing a mixture of an aqueous polyurethane or polyurethane-urea dispersion, at least one plasticizer and optionally at least one tackifier resin are suitable for the adhesive bonding of foam substrates by the spray coagulation process and do not exhibit the disadvantages of the prior art.

The present invention therefore provides formulations containing a mixture of
- I. an aqueous polyurethane or polyurethane-urea dispersion, containing as disperse phase at least one polymer A) which after drying is semicrystalline or crystalline and has a melting temperature in the range from 30 to 80° C. and an enthalpy of fusion of ≥35 J/g,
- II. at least one plasticizer B)
- III. optionally at least one tackifier resin C), wherein the mixture, based on the solids present overall, contains
60% to 80% by weight of the at least one polymer A),
20% to 40% by weight, preferably 21% to 40% by weight, of the at least one plasticizer B), and
0% to 10% by weight of the at least one tackifier resin C), and the amounts by weight of A), B) and C) add up to 100% by weight.

The mixture, based on the solids present overall, preferably contains
65% to 80% by weight of the at least one polymer A),
20% to 35% by weight, preferably 21% to 35% by weight, of the at least one plasticizer B), and
0% to 10% by weight of the at least one tackifier resin C), wherein the amounts by weight of A), B) and C) add up to 100% by weight.

The mixture, based on the solids, particularly preferably contains
70% to 80% by weight of the at least one polymer A),
20% to 30% by weight, preferably 21% to 30% by weight, of the at least one plasticizer B), and
0% to 10% by weight of the at least one tackifier resin C), wherein the amounts by weight of A), B) and C) add up to 100% by weight.

The dispersions referred to as polyurethane dispersions in connection with the present invention contain as disperse phase at least one polymer which may be one or more polyurethanes in the narrower sense, that is to say those polymers which are obtained by polymerization of polyols and polyisocyanates, but they may also be those in which monoamines and/or diamines are used as formation components, possibly as chain extenders. The dispersions that can be used according to the invention are therefore referred to as aqueous polyurethane or polyurethane-urea dispersions.

A polymer is referred to as semicrystalline or crystalline when it exhibits a melting peak in DSC measurement in accordance with DIN 65467 with a heating rate of 20 K/min. The melting peak is caused by the melting of regular substructures in the polymer. The melting temperature of the polymers or polymer layers obtained from the formulations of the invention is in this case preferably in a range from 35 to 80° C., particularly preferably from 40 to 70° C., very particularly preferably from 42 to 55° C. The enthalpy of fusion of the polymer layers obtained from the formulations of the invention is 35 J/g, preferably 40 J/g, particularly preferably 45 J/g. The first heating is evaluated in order to also detect polymers which crystallize slowly.

While the teaching of the present invention can in principle be realized with any dispersed polyurethane or polyurethane-urea polymer as polymer A), according to the invention the at least one polymer A) is preferably formed from
- A(i). at least one crystalline or semicrystalline difunctional polyester polyol having a number-average molecular weight of at least 400 g/mol and a melting temperature of at least 35° C. and a heat of fusion of at least 35 J/g,
- A(ii). optionally at least one difunctional polyol component having a number-average molecular weight of 62 to 399 g/mol,
- A(iii). an isocyanate component,
- A(iv). at least one isocyanate-reactive component bearing at least one ionic or potentially ionic group, and
- A(v). optionally further isocyanate-reactive components.

The aqueous dispersions of the invention comprise 15% to 60% by weight of the at least one polymer and 40% to 85% by weight of water, preferably 30% to 50% by weight of the at least one polymer and 50% to 70% by weight of water, particularly preferably 40% to 50% by weight of the at least one polymer and 50% to 60% by weight of water.

The at least one polymer contains 50% to 95% by weight of constituent A(i), 0 to 10% by weight of constituent A(ii), 4% to 25% by weight of constituent A(iii), 0.5% to 10% by weight of constituent A(iv) and 0 to 30% by weight of constituent A(v), wherein the sum total of the constituents adds up to 100% by weight.

In a preferred form of the invention, the at least one polymer contains 65% to 92% by weight of constituent A(i), 0 to 5% by weight of constituent A(ii), 6% to 15% by weight of constituent A(iii), 0.5% to 5% by weight of constituent A(iv) and 0 to 25% by weight of constituent A(v), wherein the sum total of the constituents adds up to 100% by weight.

In a particularly preferred form of the invention, the at least one polymer contains 75% to 92% by weight of constituent A(i), 0 to 5% by weight of constituent A(ii), 8% to 15% by weight of constituent A(iii), 0.5% to 4% by weight of constituent A(iv) and 0 to 15% by weight of constituent A(v), wherein the sum total of the constituents adds up to 100% by weight.

In a very particularly preferred form of the invention, the at least one polymer contains 80% to 90% by weight of constituent A(i), 0 to 3% by weight of constituent A(ii), 8% to 14% by weight of constituent A(iii), 0.5% to 3% by weight of constituent A(iv) and 0 to 10% by weight of constituent A(v), wherein the sum total of the constituents adds up to 100% by weight.

Suitable crystalline or semicrystalline difunctional polyester polyols A(i) are in particular linear or else slightly branched polyester polyols based on dicarboxylic acids and/or derivatives thereof such as anhydrides, esters or acid chlorides and preferably aliphatic linear polyols. Mixtures of dicarboxylic acids and/or derivatives thereof are also suitable. Suitable dicarboxylic acids are, for example, adipic acid, succinic acid, sebacic acid or dodecanedioic acid. Preference is given to succinic acid, adipic acid and sebacic acid and mixtures of these, particular preference is given to succinic acid and adipic acid and mixtures of these, and very particular preference is given to adipic acid. These are used in amounts of at least 90 mol %, preferably of from 95% to 100 mol %, based on the total amount of all carboxylic acids.

The difunctional polyester polyols A(i) can be prepared, for example, by polycondensation of dicarboxylic acids with polyols. The polyols preferably have a molecular weight of 62 to 399 g/mol, consist of 2 to 12 carbon atoms, are preferably unbranched, difunctional and preferably have primary OH groups.

Examples of polyols which may be used for the preparation of the polyester polyols A(i) include polyhydric alcohols, such as for example ethanediol, di-, tri-, tetraethylene glycol, propane-1,2-diol, di-, tri-, tetrapropylene glycol, propane-1,3-diol, butane-1,4-diol, butane-1,3-diol, butane-2,3-diol, pentane-1,5-diol, hexane-1,6-diol, 2,2-dimethyl-propane-1,3-diol, 1,4-dihydroxycyclohexane, 1,4-di-meth-ylolcyclohexane, octane-1,8-diol, decane-1,10-diol, dodecane-1,12-diol or mixtures of these.

Preferred polyol components for the polyester polyols A(i) are ethane-1,2-diol, butane-1,4-diol and hexane-1,6-diol; particular preference is given to butane-1,4-diol and hexane-1,6-diol, very particular preference is given to butane-1,4-diol.

The polyester polyols A(i) may be formed from one or more polyols. In a preferred embodiment of the present invention, they are formed from just one polyol.

If the crystalline or semicrystalline difunctional polyester polyols having a number-average molecular weight of at least 400 g/mol and a melting temperature of at least 35° C. have a heat of fusion of at least 50 J/g, then the polymer prepared using the same frequently has a heat of fusion of ≥35 J/g. If desired, adjustment of the heat of fusion of the polymer can be achieved by a slight modification of the content of polyester polyol A(i) in the composition or by a small variation of the heat of fusion of the polyester polyol. These measures require only exploratory experiments and are completely within the practical experience of a person of average skill in the art in this field.

The preparation of polyester polyols A(i) is known from the prior art.

The number-average molecular weight of the polyester polyols A(i) is preferably 400 to 4000 g/mol, more preferably 1000 to 3000 g/mol, particularly preferably 1500 to 2500 g/mol, very particularly preferably 1800 to 2400 g/mol.

The melting temperature of the crystalline or semicrystalline polyester polyols is generally at least 35° C., preferably 40 to 80° C., particularly preferably 42 to 60° C. and very particularly preferably 45 to 52° C. The heat of fusion is ≥35 J/g, preferably ≥40 J/g and particularly preferably ≥50 J/g.

Examples of difunctional polyol components having a molecular weight of 62 to 399 g/mol which are suitable as formation component A(ii) include the polyols mentioned for the preparation of the polyester polyols A(i). Low molecular weight polyester diols, polyether diols, polycarbonate diols or other polymer diols are in principle also suitable, provided they have a molecular weight of 62 to 399 g/mol.

A person of average skill in the art knows that the number-average molecular weight of polymer diols can for example be calculated from the OH number (hydroxyl number). For monomeric polyols, the molecular weight corresponds to the absolute molecular mass in g/mol.

Suitable formation components A(iii) are any desired organic compounds having at least two free isocyanate groups per molecule. Preference is given to using diisocyanates Y(NCO)$_2$, where Y is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms. Examples of such diisocyanates that are preferably to be used include tetramethylene diisocyanate, methylpentamethylene diisocyanate, hexamethylene diisocyanate, dodecamethylene diisocyanate, 1,4-diisocyanato-cyclohexane, 1-isocyanato-3,3,5-trimethyl-5-isocyanatom-ethylcyclohexane, 4,4'-diisocyanatodicyclohexylmethane, 4,4'-diisocyanato-2,2-dicyclohexylpropane, 1,4-diisocya-nato-benzene, 2,4-diisocyanatotoluene, 2,6-diisocyanato-toluene, 4,4'-diisocyanatodiphenylmethane, 2,2'- and 2,4'-diisocyanatodiphenylmethane, tetramethylxylylene diisocyanate, p-xylylene diisocyanate, p-isopropylidene diisocyanate, and mixtures composed of these compounds.

It is also possible to use proportions of higher-functionality polyisocyanates known per se in polyurethane chemistry, or else modified polyisocyanates known per se and for example comprising carbodiimide groups, allophanate groups, isocyanurate groups, urethane groups and/or biuret groups.

In addition to these simple diisocyanates, polyisocyanates containing heteroatoms in the radical linking the isocyanate groups and/or having a functionality of more than 2 isocyanate groups per molecule are also suitable. The former are, for example, polyisocyanates which have been prepared by modification of simple aliphatic, cycloaliphatic, araliphatic and/or aromatic diisocyanates, are formed from at least two diisocyanates, and have a uretdione, isocyanurate, urethane, allophanate, biuret, carbodiimide, iminooxadiazinedione and/or oxadiazinetrione structure. One example of an unmodified polyisocyanate having more than 2 isocyanate groups per molecule is 4-isocyanatomethyloctane 1,8-diisocyanate (nonane triisocyanate).

Particularly preferred formation components A(iii) are hexamethylene diisocyanate (HDI) and 1-isocyanato-3,3,5-trimethyl-5-isocyanatomethylcyclohexane (IPDI), and mixtures thereof.

Preferred isocyanate-reactive components A(iv) bearing at least one ionic or potentially ionic group are mono- and dihydroxycarboxylic acids, mono- and diaminocarboxylic acids, mono- and dihydroxysulfonic acids, mono- and diaminosulfonic acids and also mono- and dihydroxyphos-phonic acids or mono- and diaminophosphonic acids and alkali metal and ammonium salts thereof. Examples are dimethylolpropionic acid, dimethylolbutyric acid, hydroxypivalic acid, N-(2-aminoethyl)-β-alanine, N-(2-aminoethyl)-2-aminoethanesulfonic acid, N-(2-amino-ethyl)-2-aminoethanecarboxylic acid, ethylenediaminepro-pyl- or -butylsulfonic acid, propylene-1,2- or -1,3-diamine-β-ethylsulfonic acid, malic acid, citric acid, glycolic acid, lactic acid, glycine, alanine, taurine, lysine, 3,5-diamino-benzoic acid, an addition product of IPDI and acrylic acid (EP-A 0 916 647, Example 1) and the alkali metal and/or ammonium salts thereof; the adduct of sodium bisulfite onto but-2-ene-1,4-diol, polyethersulfonate, the propoxylated adduct of 2-butenediol and NaHSO$_3$, described, for example, in DE-A 2 446 440 (pages 5-9, formulae Well-suited for salt formation are hydroxides of sodium, potassium, lithium and calcium and tertiary amines such as triethylamine, dimethylcyclohexylamine and ethyldiisopro-pylamine. Other amines can also be used for salt formation, such as ammonia, diethanolamine, triethanolamine, dim-ethylethanolamine, methyldiethanolamine, aminomethyl-propanol and also mixtures of the specified and also other amines. Expediently, these amines are added only after the extensive conversion of the isocyanate groups.

Further suitable as component A(iv) are units which by addition of acids can be converted into cationic groups, such as N-methyldiethanolamine.

Particularly preferred components A(iv) are those having carboxyl and/or carboxylate and/or sulfonate groups.

Very particular preference is given to the sodium salts of N-(2-aminoethyl)-2-aminoethanesulfonic acid and N-(2-aminoethyl)-2-aminoethanecarboxylic acid, especially of N-(2-aminoethyl)-2-aminoethanesulfonic acid. Very particular preference is furthermore given to the salts of dimethylolpropionic acid.

Isocyanate-reactive components A(v) can for example be polyoxyalkylene ethers containing at least one hydroxyl or amino group. The frequently used polyalkylene oxide polyether alcohols are obtainable in a manner known per se by alkoxylation of suitable starter molecules. Alkylene oxides suitable for the alkoxylation reaction are especially ethylene oxide and propylene oxide, which can be used individually or else together in the alkoxylation reaction.

Further examples of isocyanate-reactive components A(v) are monoamines, diamines and/or polyamines, and mixtures thereof.

Examples of monoamines are aliphatic and/or alicyclic primary and/or secondary monoamines such as ethylamine, diethylamine, the isomeric propyl- and butylamines, higher linear aliphatic monoamines and cycloaliphatic monoamines such as cyclohexylamine. Further examples are aminoalcohols, i.e. compounds containing amino and hydroxyl groups in one molecule, such as for example ethanolamine, N-methylethanolamine, diethanolamine or 2-propanolamine. Examples of diamines are ethane-1,2-diamine, hexamethylene-1,6-diamine, 1-amino-3,3,5-trimethyl-5-aminomethylcyclohexane (isophoronediamine), piperazine, 1,4-diaminocyclohexane and bis(4-aminocyclohexyl)methane. Adipic dihydrazide, hydrazine and hydrazine hydrate are furthermore suitable. Further examples are aminoalcohols, i.e. compounds containing amino and hydroxyl groups in one molecule, such as for example 1,3-diamino-2-propanol, N-(2-hydroxyethyl)ethylenediamine or N,N-bis(2-hydroxyethyl)ethylenediamine Examples of polyamines are diethylenetriamine and triethylenetetramine.

In a preferred form of the invention, the at least one polymer used according to the invention contains, for adjusting the molar mass, at least one monoamine and/or at least one diamine as isocyanate-reactive component A(v).

The aqueous polyurethane or polyurethane-urea dispersions preferably do not contain any external emulsifiers.

In one particular embodiment of the invention, the at least one polymer A) contains a polyester of adipic acid and butane-1,4-diol as component A(i), butane-1,4-diol as component A(ii), 1-isocyanato-3,3,5-trimethyl-5-isocyanatomethylcyclohexane (IPDI) as component A(iii), the sodium salt of N-(2-aminoethyl)-2-aminoethanesulfonic acid as component A(iv) and diethanolamine as component A(v).

An above-described polymer A) which after drying is semicrystalline or crystalline and has a melting temperature in the range from 30 to 80° C. and an enthalpy of fusion of ≥35 J/g can preferably be present in the formulation according to the invention.

It is also possible according to the invention for more than one corresponding polymer A), for example two, three or more corresponding polymers A), to be present in the formulation.

In a further preferred embodiment, in addition to the mentioned polymer A), at least one further polymer is present in the formulation according to the invention, in particular a polymer which in a departure from the above-described preferred structure of polymer A) as component A(i) contains at least one amorphous, difunctional polyester polyol having a number-average molecular weight of at least 400 g/mol.

Particularly preferably, the mixture of polymer A) and of the at least one further polymer after drying is semicrystalline and has a melting temperature in the range from 30 to 80° C. and an enthalpy of fusion of ≥35 J/g.

"Plasticizer" designates chemical substances which are added to polymers in order to make them soft, flexible, extensible and supple for use or for further processing.

Preferably according to the invention, as plasticizers B), use is made of non-volatile, low molecular weight compounds bearing polar groups. Preferred plasticizers are di(phenoxyethyl) formal and non-volatile esters based on aromatic carboxylic acids such as phthalic acid, isophthalic acid, terephthalic acid, benzoic acid, trimellitic acid; on aliphatic carboxylic acids such as maleic acid, fumaric acid, succinic acid, acetic acid, propionic acid, butyric acid, adipic acid, azelaic acid, sebacic acid, citric acid, cyclohexanedicarboxylic acid, or on fatty acids such as oleic acid, ricinoleic acid or stearic acid; and phosphoric, sulfonic or alkylsulfonic esters. Preference is also given to epoxidized vegetable oils such as epoxidized linseed oil and epoxidized soybean oil.

Particular preference is given to di(phenoxyethyl) formal, dibutyl terephthalate, alkylsulfonic esters of phenol and esters based on benzoic acid. Very particular preference is given to di(phenoxyethyl) formal, dibutyl terephthalate and dipropylene glycol dibenzoate. In a very particularly preferred embodiment of the present invention, the plasticizer B) used is di(phenoxyethyl) formal or dipropylene glycol dibenzoate. In a very particularly preferred embodiment of the present invention, the plasticizer B) used is dipropylene glycol dibenzoate.

In a preferred embodiment of the present invention, no tackifier resin C) is present, that is to say the formulation according to the invention contains a mixture of I. an aqueous polyurethane or polyurethane-urea dispersion, containing as disperse phase at least one polymer A) which after drying is semicrystalline or crystalline and has a melting temperature in the range from 30 to 80° C. and an enthalpy of fusion of ≥35 J/g, II. at least one plasticizer B), wherein the mixture, based on the solids present overall, contains 60% to 80% by weight of the at least one polymer A), 20% to 40% by weight, preferably 21% to 40% by weight, of the at least one plasticizer B), and the amounts by weight of A) and B) add up to 100% by weight.

The mixture according to this embodiment, based on the solids present overall, preferably contains 65% to 80% by weight of the at least one polymer A) and 20% to 35% by weight, preferably 21% to 35% by weight, of the at least one plasticizer B), wherein the amounts by weight of A) and B) add up to 100% by weight.

The mixture according to this embodiment, based on the solids, particularly preferably contains 70% to 80% by weight of the at least one polymer A) and 20% to 30% by weight, preferably 21% to 30% by weight, of the at least one plasticizer B), wherein the amounts by weight of A) and B) add up to 100% by weight.

In a second embodiment according to the invention, at least one tackifier resin C) is present. If at least one tackifier resin as component C) is present in the mixture according to the invention, it is present for example in an amount of from 0.1% to 10% by weight, preferably 1% to 10% by weight, particularly preferably 2% to 8% by weight, wherein the components are present in the mentioned amounts and the amounts by weight of A), B) and C) add up to 100% by weight.

"Tackifier resins" refer to resins which act as a tackifier and which increase the adhesion capacity of a plastic or of an adhesive.

The tackifier resins C) used may be natural or synthetic resins, for example aliphatic, aromatically modified, aromatic and hydrogenated hydrocarbon resins, terpene resins, modified terpene resins and terpene-phenol resins, or tree resin derivatives such as rosins, modified rosins such as resin esters based on rosin (rosin esters), balsam tree derivatives (gum rosin) and tall oil derivatives (tall oil rosin). The tackifier resins can be used individually or in mixtures.

The tackifier resins C) used are preferably rosins and modified rosins. Particular preference is given to using resin esters based on rosin. The tackifiers can be used as 100% resins or as a dispersion in the formulations according to the invention, so long as compatibility (e.g. stability against phase separation) is provided. In a particularly preferred embodiment of the present invention, as component C), use is made of aqueous dispersions of rosin esters (rosin ester dispersions).

The formulations according to the invention are preferably used for adhesive bonding by the spray coagulation process. In this process, the aqueous adhesive formulations and also a coagulant are conveyed separately into a two-component spray gun and mixed in the spray jet. Spraying is typically effected using atomizer air at 0.1 to 5 bar of pressure; however, it is also possible to deliver at least one of the two components airlessly, as described for example in WO 2015/137808. The coagulation of the dispersion in the spray jet takes place on the path to the surface of the first substrate; a portion of the water present in the adhesive dispersion already evaporates in the process. On impact, the adhesive polymer forms on the surface of the first substrate a film which is immediately tacky in the still-wet state. As the mixing of adhesive dispersion and coagulant does not take place until in the spray jet, no pot life needs to be taken into account. On account of the tackiness of the polymer film in the wet state, the second surface can be immediately joined, ideally for example with pressure on the substrates towards the adhesive surface. The application of pressure by pressing the two substrate surfaces together is advantageous since is increases the strength of the bond. It is likewise advantageous when at least one of the two substrates is porous or permeable to water, in order to allow for the transport of water away out of the solidifying adhesive joint.

Suitable coagulants include aqueous solutions of salts, preferably of metals of the first, second and third main group of the Periodic Table, in particular if they exhibit a good water solubility. Salts based on divalent or trivalent cations are preferably used. Particular preference is given to using calcium chloride, zinc sulfate or aluminium sulfate. Very particular preference is given to using calcium chloride. Mixtures of different salts as per the above description can also be used as the aqueous solution.

The concentration of the salts in the aqueous salt solutions suitable as coagulant is generally 1% to 20% by weight, preferably 2% to 10% by weight and particularly preferably 3% to 4% by weight.

The proportion of the aqueous solution of the coagulant, based on the sum of adhesive solution plus coagulant solution, is 0.1% to 50% by weight, preferably 1% to 30% by weight, particularly preferably 8% to 20% by weight and very particularly preferably 12% to 18% by weight.

Alternatively, coagulants used may also be aqueous solutions of inorganic or organic acids, preferably citric acid, phosphoric acid or carbonic acid, and mixtures of one or more of the abovementioned salts with one or more of these acids.

The formulations according to the invention are preferably prepared by mixing the aqueous polyurethane or polyurethane-urea dispersion with the plasticizer and optionally the tackifier resin. This can be done in any desired sequence. The polyurethane dispersion is preferably initially charged and subsequently optionally the tackifier resin C) and the plasticizer B), optionally in succession, are added with stirring. Preference is given here to using stirrers having a sufficiently great introduction of shear force. Suitable stirrers are known to the person skilled in the art or can be determined by simple preliminary experiments.

The adhesive bonds, produced with the formulations according to the invention by the spray coagulation process, display sufficient immediate strengths in the case of foam substrates having a high foam density of 70 kg/m$^3$ and more and therefore an associated high restoring force.

A foam substrate is understood to mean a substrate made of foam, foams generally being synthetically produced substances having a cellular structure and low density. A distinction can be made here between open-cell, closed-cell and mixed-cell foams. Depending on the hardness, foams are divided into rigid and flexible foams. Virtually all plastics are suitable for foaming. An important characteristic of foams is the foam density. This is expressed in kg/m$^3$ and gives the weight of a foam block having an edge length of 1 m. The foam density is considered to be the most important feature for distinguishing between foams, other properties largely depend on it. The higher the foam density, the greater the restoring force and the higher the requirements on the immediate strengths of the adhesives.

In principle, the formulations according to the invention are suitable for the adhesive bonding of all foam substrates by the spray coagulation process. Preference is given to adhesively bonding open-cell and mixed-cell foam substrates. Even foam substrates having a high foam density and high restoring force can be adhesively bonded here.

In a preferred embodiment of the invention, the foam substrate(s) is/are composed of polyurethane (for example polyether and polyester foams) and/or a rubber, such as for example natural rubber (NR), styrene-butadiene rubber (SBR), ethylene-propylene-diene polymer (EPDM), butadiene-acrylonitrile rubber (NBR) or chloroprene rubber (CR).

In a particularly preferred embodiment of the invention, the foam substrate(s) is/are composed of polyurethane.

The adhesive bonds, produced with the formulations according to the invention by the spray coagulation process, display heat resistances of at least 70° C., preferably at least 80° C.

The open time, that is to say the time period between application of the formulations according to the invention by the spray coagulation process until joining together the parts to be joined, during which a sufficiently good bonded connection is still obtained, is frequently at least 5 minutes, preferably at least 8 minutes.

The formulations according to the invention moreover feature good adhesion to a very wide variety of other substrates, such as for example to foam, wood, paper, leather, textiles, cork, and plastics (thermoplastics, elastomers, thermosets, composites) such as different polyvinyl chloride qualities, polyurethanes, polyvinyl acetate, ABS, rubbers, polyethyl vinyl acetate or polycarbonate.

The adhesive compositions, containing the formulations according to the invention, are thus suitable for the adhesive bonding of any desired substrates, preferably formed from the abovementioned materials.

The present invention therefore also relates to the use of the formulations according to the invention for the adhesive bonding of substrates composed of foam, wood, paper, leather, textiles, cork and plastics (thermoplastics, elastomers, thermosets, composites) such as different polyvinyl chloride qualities, polyurethanes, polyvinyl acetate, ABS, rubbers, polyethyl vinyl acetate or polycarbonate, in particular for the adhesive bonding of foam on foam, foam on wood, foam on plastics, and of textiles on various substrates.

The present invention further preferably relates to the use according to the invention, wherein at least one of the substrates to be adhesively bonded is a foam substrate selected from the group comprising polyurethane foam (for example polyether and polyester foams) or foam rubber (for example formed from natural rubber (NR), styrene-butadiene rubber (SBR), ethylene-propylene-diene polymer (EPDM), butadiene-acrylonitrile rubber (NBR) or chloroprene rubber (CR)).

The present invention further also relates to mattresses or furniture produced using the formulations according to the invention.

EXAMPLES

The invention will be elucidated in more detail below on the basis of the examples. The following methods and test methods were used here:

A) Spray Coagulation Process:

A standard spray gun for two-component dispersion adhesives, namely the PILOT III 2K from Walther Pilot, was used for application. The adhesive and the coagulant $CaCl_2$ (3% by weight solution in water) were conveyed separately into the spray gun, mixed in the spray jet and the adhesive was coagulated. As the mixing did not take place until in the spray jet, no pot life needed to be taken into account. A ratio of 86% by weight adhesive dispersion and 14% by weight $CaCl_2$ solution was chosen.

The precise settings of the spray gun are known in principle to the person skilled in the art and can be tailored to the specific case without undue burden and determined by simple preliminary experiments. The quantitative ratios and the application weight were determined by reweighing the reservoir vessel and the substrates.

The following settings were used:
a.) Adhesive component: conveying pressure 1.3 bar
b.) Coagulation component: conveying pressure 0.3 bar
c.) Atomizer air pressure: 2.8 bar
d.) Bore diameter (nozzle) for adhesive component: 1.0 mm
e.) Bore diameter (nozzle) for coagulant component 0.4 mm
f.) Application weights: 130-150 $g/m^2$ (wet)

B) Determination of the Initial Strength

B1) Test Specimen

Standard Foam Variation

As test material, PU foam bodies were used as follows: foam grade stn/schaumstoff-technik-Nürnberg GmbH, type ST 5540, test specimen dimensions 101×49×30 mm, material basis PUR, colour white, gross density 40 $kg/m^3$, net density 38 $kg/m^3$ (ISO-845), compression hardness 5.5 kPa (40%, DIN EN ISO 3386) tensile strength >120 kPa (DIN EN ISO 1798), elongation at break >110% (ISO-1798), compression set <4 (50%/70° C./22 h, DIN EN ISO-1856)

Rigid Foam Variation

As test material, PU foam bodies (rigid) were used as follows: foam grade stn/schaumstoff-technik-Nürnberg GmbH, type ST 5540, test specimen dimensions 100×50×30 mm, material basis PUR, colour white, gross density 70 $kg/m^3$, net density 64 $kg/m^3$ (ISO-845), compression hardness 12.0 kPa (40%, DIN EN ISO 3386) tensile strength >100 kPa (DIN EN ISO 1798), compression set <5 (50%/70° C./22 h, DIN EN ISO-1856)

B2) Determination of the Initial Strength:

As test material, ST 5540 PU foam test specimens (1) were used. The apparatus for determining the initial strength is illustrated in The FIGURE. For assessment of the initial strength, immediately after application of the adhesive to the upper side (2) of the foam bodies (1) by the spray coagulation process (application rate 130 to 150 $g/m^2$ wet), the test specimens were folded (4) in the middle with a wooden rod (3) (7×7 mm square) and fed by means of the test apparatus (5) through 2 steel rolls (6) (diameter 40 mm, length 64 mm) the tangential spacing (7) of which was previously set to 10 mm using a threaded spindle (8).

B3) Assessment of the Initial Strength

The initial strength was sufficient if the test specimen or the bond seam (9) no longer comes undone despite the restoring forces present in the test specimen (positive assessment).

For better quantification of the initial strength, this was evaluated as follows:

1 Excellent (+++):

The stress was immediately withstood after drawing the test specimen once through the gap between the two rolls, and the foam body after 120 sec. of being pulled apart from both sides comprised material tearing, or could be unfolded again only with a high expenditure of force.

2 Very Good (++):

The stress was immediately withstood after drawing the test specimen once through the gap between the two rolls, but the foam body could easily be unfolded again without high expenditure of force after 120 sec. by being pulled apart from both sides.

3 Good (+):

Although the test specimen unfolded after drawing the test specimen once through the gap between the two rolls, after a repetition or upon subsequent manual pressure (1× pressure application for approx. 1 sec.) the test specimen remained closed.

4 Poor (−):

The stress was withstood neither after drawing through the rolls multiple times nor upon manual pressure, and the test specimen unfolded.

C) Heat Resistance Test Method:

Determination of the Heat Resistance

To test the heat resistance, test specimens were produced from PU foam bodies of the standard foam variation (see B1) and a wooden rod (7×7 mm square) according to method B2. The closed test specimens were first stored for 24 hours at room temperature and then for 20 minutes at 40° C. in an air circulation oven. Provided the test specimens did not unfold, the temperature was increased in steps of 10° C. every 20 minutes until bond failure occurred. They are designated as heat resistant with the corresponding temperature indication when no bond failure could be observed at this temperature even after 20 minutes.

D) Ascertaining the Glass Transition Temperatures, Melting Temperatures and Enthalpies of Fusion by Means of DSC:

The glass transition temperatures and also melting temperatures and enthalpies of fusion were determined by means of differential scanning calorimetry (DSC) using a Pyris Diamond DSC calorimeter from Perkin-Elmer. To this end, a film was produced by knife coating the dispersion onto a glass sheet at a 100 μm wet film thickness, flashed off for 2 hours, and subsequently this film together with the glass sheet was dried in a dry box for 3 days at room temperature and 0% relative room humidity. Subsequently, using 10 mg of sample material from this film, the DSC curve is recorded with the following measurement conditions: Rapid cooling to the starting temperature –100° C., then commencement of three heatings from –100° C. to +150° C. at a heating rate of 20 K/min and a cooling rate of 320 K/min under a helium atmosphere and with cooling with liquid nitrogen. The glass transition temperature corresponds to the temperature at half the height of the glass transition, with the third heating being assessed. For determination of the melting temperatures and enthalpies of fusion, the first heating was assessed.

E) Open Time Test Method:

100 g/m$^2$ of formulation was applied to the test specimen (standard foam) having the dimensions 22×5 cm. The thickness of the test specimen is 3 cm. The specimen is folded in the middle and joined together once by the palms of the hand. This procedure is repeated with the corresponding amount of prepared test specimens after time intervals of in each case 1 minute, until the adhesive bond fails. The open time is the last time determined before the failure of the bond. A maximum of 20 minutes is measured.

F) Feedstocks

Polyester I: polyester diol formed from butane-1,4-diol and adipic acid having an OH number=50

Polyester II: polyester diol formed from hexane-1,6-diol and phthalic anhydride having an OH number=56

Desmodur® H: hexamethylene 1,6-diisocyanate (Covestro Deutschland AG, Leverkusen/Germany)

Desmodur® I: isophorone diisocyanate (Covestro Deutschland AG, Leverkusen/Germany) dipropylene glycol dibenzoate: plasticizer, examples of commercial products include Synegis 9100 from Synegis, Mont-Saint-Guibert/Belgium, or Benzoflex 9-88 from Eastman Chemical Company Aquatac® XR-4343: aqueous rosin ester dispersion having 60% by weight solids content (Kraton Corporation, Almere/the Netherlands) (tackifier resin)

Example 1

Preparation of an Aqueous Polyurethane or Polyurethane-Urea Dispersion.

450 g of polyester I are dewatered for 1 hour at 110° C. and 15 mbar. At 80° C., 30.11 g of Desmodur® H and subsequently 20.14 g of Desmodur® I are added. The mixture is stirred at 80 to 90° C. until a constant isocyanate content of 1.15% by weight has been reached. The reaction mixture is dissolved in 750 g of acetone and cooled to 48° C. Into the homogeneous solution is added a solution of 5.95 g of the sodium salt of N-(2-aminoethyl)-2-aminoethanesulfonic acid and 2.57 g of diethanolamine in 65 g of water with vigorous stirring. After 30 minutes, the mixture is dispersed by addition of 700 g of water. Distillative removal of the acetone affords an aqueous polyurethane-polyurea dispersion having a solids content of 40.0% by weight.

The polymer present is semicrystalline after drying with a melting temperature of 48° C. and an enthalpy of fusion of 50.4 J/g.

Example 2

Preparation of an Aqueous Polyurethane or Polyurethane-Urea Dispersion.

1215 g of polyester II are dewatered for 1 hour at 110° C. and 15 mbar. At 80° C., 4.6 g of hexane-1,6-diol and 179.0 g of Desmodur® H are added and the mixture is stirred at 90° C. until a constant isocyanate content of 2.28% by weight has been reached. The reaction mixture is dissolved in 2490 g of acetone and cooled to 48° C. Into the homogeneous solution is added a solution of 31.9 g of the sodium salt of N-(2-aminoethyl)-2-aminoethanesulfonic acid in 300 g of water with vigorous stirring. After 30 minutes, the mixture is dispersed by addition of 1150 g of water. Distillative removal of the acetone affords an aqueous polyurethane-polyurea dispersion having a solids content of 50.0% by weight.

The polymer present is amorphous after drying (does not have a melting peak in DSC).

Example 3

80 parts by weight of the dispersion from Example 1 and 20 parts by weight of the dispersion from Example 2 are mixed and homogenized with stirring. The resulting mixture has a solids content of 42% by weight.

The mixture of polymers present is semicrystalline after drying with a melting temperature of 52° C. and an enthalpy of fusion of 40 J/g.

Example 4 (Comparative)

To 95.0 g of the polyurethane dispersion from Example 1 are added 5.0 g of di(propylene glycol) dibenzoate with vigorous stirring using a disk stirrer, the mixture is stirred for a further 4 h and subsequently stored for 12 h at room temperature. Based on the solids content, the formulation contains 88.4% by weight of polyurethane polymer and 11.6% by weight of plasticizer resin.

Example 5

To 90.0 g of the polyurethane dispersion from Example 1 are added 10.0 g of di(propylene glycol) dibenzoate with vigorous stirring using a disk stirrer, the mixture is stirred for a further 4 h and subsequently stored for 12 h at room temperature. Based on the solids content, the formulation contains 78.3% by weight of polyurethane polymer and 21.7% by weight of plasticizer resin.

Example 6

To 85.0 g of the polyurethane dispersion from Example 1 are added 15.0 g of di(propylene glycol) dibenzoate with vigorous stirring using a disk stirrer, the mixture is stirred for a further 4 h and subsequently stored for 12 h at room temperature. Based on the solids content, the formulation contains 69.4% by weight of polyurethane polymer and 30.6% by weight of plasticizer resin.

Example 7 (Comparative)

To 84.0 g of the polyurethane dispersion from Example 1 are added in succession 9.0 g of Aquatac® XR-4343 and 7.0 g of di(propylene glycol) dibenzoate with vigorous stirring using a disk stirrer, the mixture is stirred for a further 4 h and subsequently stored for 12 h at room temperature. A viscous mass is obtained which is unsuitable for the spray coagulation process even after dilution with water. Based on the solids content, the formulation contains 73.1% by weight of polyurethane polymer, 11.7% by weight of tackifier resin and 15.2% by weight of plasticizer resin.

Example 8 (Comparative)

To 95.0 g of the polyurethane dispersion from Example 3 are added 5.0 g of di(propylene glycol) dibenzoate with vigorous stirring using a disk stirrer, the mixture is stirred for a further 4 h and subsequently stored for 12 h at room temperature. Based on the solids content, the formulation contains 88.9% by weight of polyurethane polymer and 11.1% by weight of plasticizer resin.

Example 9

To 90.0 g of the polyurethane dispersion from Example 3 are added 10.0 g of di(propylene glycol) dibenzoate with vigorous stirring using a disk stirrer, the mixture is stirred for a further 4 h and subsequently stored for 12 h at room temperature. Based on the solids content, the formulation contains 79.1% by weight of polyurethane polymer and 20.9% by weight of plasticizer resin.

Example 10

To 85.0 g of the polyurethane dispersion from Example 3 are added 15.0 g of di(propylene glycol) dibenzoate with vigorous stirring using a disk stirrer, the mixture is stirred for a further 4 h and subsequently stored for 12 h at room temperature. Based on the solids content, the formulation contains 70.4% by weight of polyurethane polymer and 29.6% by weight of plasticizer resin.

Example 11

To 80.0 g of the polyurethane dispersion from Example 3 are added 20.0 g of di(propylene glycol) dibenzoate with vigorous stirring using a disk stirrer, the mixture is stirred for a further 4 h and subsequently stored for 12 h at room temperature. Based on the solids content, the formulation contains 62.7% by weight of polyurethane polymer and 37.3% by weight of plasticizer resin.

Example 12 (Comparative)

To 70.0 g of the polyurethane dispersion from Example 3 are added 30.0 g of di(propylene glycol) dibenzoate with vigorous stirring using a disk stirrer, the mixture is stirred for a further 4 h and thereafter stored for 12 h at room temperature. Due to the viscosity of the formulation, which was too high for the spray coagulation process, 10 g of water were subsequently added and the mixture was stirred for a further hour. Based on the solids content, the formulation contains 49.5% by weight of polyurethane polymer and 50.5% by weight of plasticizer resin.

Example 13

To 80.0 g of the polyurethane dispersion from Example 3 are added in succession 5.0 g of Aquatac® XR-4343 and 15.0 g of di(propylene glycol) dibenzoate with vigorous stirring using a disk stirrer, the mixture is stirred for a further 4 h and subsequently stored for 12 h at room temperature. Based on the solids content, the formulation contains 65.1% by weight of polyurethane polymer, 5.8% by weight of tackifier resin and 29.1% by weight of plasticizer resin.

Example 14 (Comparative)

To 70.0 g of the polyurethane dispersion from Example 3 are added in succession 5.0 g of Aquatac® XR-4343 and 30.0 g of di(propylene glycol) dibenzoate with vigorous stirring using a disk stirrer, the mixture is stirred for a further 4 h and thereafter stored for 12 h at room temperature. Due to the viscosity of the formulation, which was too high for the coagulation process, 10 g of water were subsequently added and the mixture was stirred for a further hour. Based on the solids content, the formulation contains 47.1% by weight of polyurethane polymer, 4.8% by weight of tackifier resin and 48.1% by weight of plasticizer resin.

Example 15 (Comparative)

To 70.0 g of the polyurethane dispersion from Example 3 are added in succession 10.0 g of Aquatac® XR-4343 and 30.0 g of di(propylene glycol) dibenzoate with vigorous stirring using a disk stirrer, the mixture is stirred for a further 4 h and thereafter stored for 12 h at room temperature. Due to the viscosity of the formulation, which was too high for the spray coagulation process, 5 g of water were subsequently added and the mixture was stirred for a further hour. Based on the solids content, the formulation contains 44.9% by weight of polyurethane polymer, 9.2% by weight of tackifier resin and 45.9% by weight of plasticizer resin.

TABLE 1

| | | | | | | | | | | | | |
|---|---|---|---|---|---|---|---|---|---|---|---|---|
| Evaluation of the examples according to the invention and the comparative examples (data in % by weight are in each case based on the solids content) | | | | | | | | | | | | |
| Example | 4 (C) | 5 | 6 | 7 (C) | 8 (C) | 9 | 10 | 11 | 12 (C) | 13 | 14 (C) | 15 (C) |
| PUD from Example 3 [% by wt.] | — | — | — | — | 88.9 | 79.1 | 70.4 | 62.7 | 49.5 | 65.1 | 47.1 | 44.9 |
| PUD from Example 1 [% by wt.] | 88.4 | 78.3 | 69.4 | 73.1 | — | — | — | — | — | — | — | — |
| Aquatec 4343 [% by wt.] | — | — | — | 15.2 | — | — | — | — | — | 5.8 | 4.8 | 9.2 |
| Di(propylene glycol) dibenzoate [% by wt.] | 11.6 | 21.7 | 30.6 | 11.7 | 11.1 | 20.9 | 29.6 | 37.3 | 50.5 | 29.1 | 48.1 | 45.9 |
| Total [% by wt.] | 100.00 | 100.00 | 100.00 | 100.00 | 100.00 | 100.00 | 100.00 | 100.00 | 100.00 | 100.00 | 100.00 | 100.00 |
| Heat resistance [° C.] | 80 | 90 | 90 | n.m. | 90 | 90 | 80 | 80 | 60 | 80 | 50 | 40 |
| Open time [min] | 6 | 9 | 10 | n.m. | 2 | 8 | 9 | 15 | ≥20 | 9 | ≥20 | ≥20 |

TABLE 1-continued

Evaluation of the examples according to the invention and the comparative
examples (data in % by weight are in each case based on the solids content)

| Example | 4 (C) | 5 | 6 | 7 (C) | 8 (C) | 9 | 10 | 11 | 12 (C) | 13 | 14 (C) | 15 (C) |
|---|---|---|---|---|---|---|---|---|---|---|---|---|
| Initial strength (standard foam) | ++ | ++ | +++ | n.m. | ++ | ++ | ++ | +++ | ++ | +++ | ++ | ++ |
| Initial strength (rigid foam) | – | + | ++ | n.m. | – | + | ++ | ++ | ++ | ++ | ++ | ++ |

(C) comparison
n.m. not measurable

The invention claimed is:

1. A formulation comprising a mixture of:
I. an aqueous polyurethane or polyurethane-urea dispersion, containing as disperse phase at least one polymer A) which after drying is semicrystalline or crystalline and has a melting temperature in the range from 30 to 80° C. and an enthalpy of fusion of ≥35 J/g, wherein polymer A consists of components:
A(i) at least one crystalline or semicrystalline difunctional polyester polyol having a number-average molecular weight of at least 400 g/mol and a melting temperature of at least 35° C. and a heat of fusion of at least 35 J/g,
A(ii) optionally at least one difunctional polyol component having a number-avenge molecular weight of 62 to 390 g/mol,
A(iii) an isocyanate component selected from the group consisting of hexamethylene diisocyanate (HDI) and 1-isocyanato-3,3,5-trimethyl-5-isocyanatomethylcyclohexane (IPDI), and mixtures thereof,
A(iv) at least one isocyanate-reactive component bearing at least one ionic or potentially ionic group, and
A(v) optionally further isocyanate-reactive components,
II. at least one plasticizer B),
I. optionally at least one tackifier resin C),
wherein the mixture, based on the solids present overall, comprises:
60% to 80% by weight of the at least one polymer A),
20% to 40% by weight of the at least one plasticizer B), and
0% to 10% by weight of the at least one tackifier resin C), and the amounts by weight of A), B) and C) add up to 100% by weight.

2. The formulation according to claim 1, wherein the mixture, based on the solids present overall, comprises:
65% to 80% by weight of the at least one polymer A),
20% to 35% by weight of the at least one plasticizer B), and
0% to 10% by weight of the at least one tackifier resin C), and the amounts by weight of A), B) and C) add up to 100% by weight.

3. The formulations of claim 2, wherein the mixture, based on the solids present overall, comprises:
70%-80% by weight of the at least one polymer A),
20% to 30% by weight of the at least one plasticizer B), and
0% to 10% by weight of the at least one tackifier resin C), and the amounts by weight of A), B) and C) add up to 100% by weight.

4. The formulation of claim 1, wherein the at least one polymer A) which after drying is semicrystalline or crystalline has a melting temperature in the range from 35 to 80° C.

5. The formulation of claim 4, wherein the at least one polymer A) which after drying is semicrystalline or crystalline has a melting temperature in the range from 40 to 70° C.

6. The formulation of claim 5, wherein the at least one polymer A) which after drying is semicrystalline or crystalline has a melting temperature in the range from 42 to 55° C.

7. The formulation of claim 1, wherein the at least one polymer A) which after drying is semicrystalline or crystalline has an enthalpy of fusion of ≥35 J/g.

8. The formulation of claim 7, wherein the at least one polymer A) which after drying is semicrystalline or crystalline has an enthalpy of fusion of ≥40 J/g.

9. The formulation of claim 8, wherein the at least one polymer A) which after drying is semicrystalline or crystalline has an enthalpy of fusion of ≥45 J/g.

10. The formulation of claim 1, wherein the at least one plasticizer B) comprises di(phenoxyethyl) formal and nonvolatile esters based on aromatic carboxylic acids, aliphatic carboxylic acids, or fatty acids; or phosphoric, sulfonic or alkylsulfonic, esters.

11. The formulation of claim 1, wherein the at least one plasticizer B) comprises at least one compound selected from the group consisting of di(phenoxyethyl) formal, dibutyl terephthalate, alkylsulfonic esters of phenol and esters based on benzoic acid.

12. A process for adhesively bonding substrates by mixing a formulation of claim 1 with a coagulant in a two-component spray gun, wherein the coagulant is conveyed separately into the two-component spray gun and is mixed in the spray jet and the coagulation of the dispersion in the spray jet takes place on the path to the surface of the first substrate, on impact with said substrate forms a film which is immediately tacky in the still-wet state and in the wet state the second surface is immediately joined, if required with pressure on the substrates towards the adhesive surface.

13. Substrates adhesively bonded with the formulation of claim 1, wherein the substrates are composed of foam, wood, paper, leather, textiles, cork, or plastics.

14. The substrates of claim 13, wherein the substrates comprise a first substrate that is foam or textiles, adhesively bonded to a second substrate that is foam, wood, or plastic.

15. The substrates of claim 14, wherein the first substrate is polyurethane foam or foam rubber.

16. A mattress or furniture comprising the formulation of claim 1.

* * * * *